United States Patent
Klausmeier et al.

[11] Patent Number: 5,570,360
[45] Date of Patent: Oct. 29, 1996

[54] METHOD AND APPARATUS FOR IMPLEMENTING COMMUNICATION SERVICE CONTRACT USING CELL ARRIVAL INFORMATION

[75] Inventors: Daniel E. Klausmeier, Sunnyvale; Charles M. Corbalis, Saratoga, both of Calif.

[73] Assignee: Stratacom, Inc., San Jose, Calif.

[21] Appl. No.: 407,906

[22] Filed: Mar. 20, 1995

[51] Int. Cl.[6] ................................. H04L 12/54
[52] U.S. Cl. ..................... 370/60; 370/60.1; 370/94.1
[58] Field of Search ................... 370/60.1, 60, 94.1, 370/85.7, 79, 17, 84, 85.6

[56] References Cited

U.S. PATENT DOCUMENTS

| | | | |
|---|---|---|---|
| 5,313,454 | 5/1994 | Bustini et al. | 370/13 |
| 5,359,592 | 10/1994 | Corbalis et al. | 370/17 |
| 5,379,297 | 1/1995 | Glover et al. | 370/60.1 |
| 5,408,472 | 4/1995 | Hluchyj et al. | 370/94.1 |
| 5,412,647 | 5/1995 | Giroux et al. | 370/60 |
| 5,412,649 | 5/1995 | Hummel | 370/60.1 |
| 5,436,891 | 7/1995 | Grossman et al. | 370/60 |
| 5,455,825 | 10/1995 | Lauer et al. | 370/60 |

*Primary Examiner*—Melvin Marcelo
*Assistant Examiner*—Melissa Kay Carman
*Attorney, Agent, or Firm*—Blakely, Sokoloff, Taylor & Zafman LLP

[57] ABSTRACT

To simplify the service decision made in a queue based digital switch, a method and apparatus is introduced that makes service decisions based upon the history of incoming cells. The apparatus includes a minimum service rate circuit that monitors the rate of arriving cells. The minimum service rate circuit tests the arriving cells to determine if they are in conformance with the minimum service rate of a service contract. The minimum service rate circuit may use a continuous state leaky bucket algorithm as specified in the CCITT Recommendation I.371 document, dated 1992, to determine if a cell is in conformance with the minimum service rate of the service contract. When a cell arrives that conforms to the minimum service rate, the minimum service rate circuit notifies the server and the server serves the queue associated with the connection.

15 Claims, 14 Drawing Sheets

METHOD AND APPARATUS FOR IMPLEMENTING COMMUNICATION SERVICE CONTRACT USING CELL ARRIVAL INFORMATION

FIELD OF THE INVENTION

The present invention relates to the field of digital communication switches. More particularly, the present invention relates to a digital switch that uses the history of cell arrivals to make service decisions.

BACKGROUND OF THE INVENTION

Cell switching is a method of transmitting digital information wherein the information is broken into equal sized units called "cells." The cells of information are usually grouped into larger units called "frames."

The individual cells of information are transmitted from a source node to a destination node through a "connection." A connection consists of a pathway through a digital network. A digital network is constructed of digital switches coupled together by digital communication lines. At the destination node, the individual cells of information may be reconstructed into the frame.

Each cell originates at a source node and is transmitted across the communications lines. The communication lines carry the cells of information between the digital switches along the connection pathway. The digital switches route the cells from incoming communication lines to outgoing communication lines and finally to a destination node coupled to a digital switch.

Each digital switch in the network can be connected to several communication lines. Furthermore, each communication line can carry several different connections simultaneously. A digital switch may employ a set of queues to handle the connections and a queue server to serve the queues. For such digital switches, serving a connection with the queue server entails removing an incoming cell from an input queue associated with the connection and sending the cell out on a communication line or to a destination node coupled to the digital switch. A service algorithm is employed to select a connection for service. To fully utilize the bandwidth of a communication line, it must be possible to select a cell for service during each service time. The service time refers to the amount of time it takes to transmit a single cell onto the communication line. The objective of the service algorithm is to ensure that every connection receives the appropriate amount of service.

When a communication service provider agrees to provide service to a customer, the two parties enter into a communication traffic contract. This contract contains constraints that the customer agrees to adhere to. These constraints are referred to in this document as an arrival contract. For example, the arrival contract may limit the customer on how fast the customer may send cells to the network. Another part of the communication traffic contract may be used when a queue and queue server are used in the connection. For connections with a queue and queue server, the service provider may agree to provide the customer with a minimal level of service. This minimal level of service is referred to in this document as a service contract and may contain an initial burst and a minimum service rate.

To implement the arrival contract, the digital switch has a traffic policing circuit at the customer interface to the digital switch. The traffic policing circuit monitors the incoming cells sent from the customer to the service provider and determines when cells do not conform to the arrival contract. To implement a service contract, the digital switch has a service algorithm circuit that determines when the digital switch should service the queues for each connection that are handled by the digital switch. The service contract is not necessary when there is no queue associated with a connection.

SUMMARY AND OBJECTS OF THE INVENTION

One object of the present invention is to provide a simplified service algorithm that makes service decisions based upon the history of cell arrivals. By monitoring the arrival of incoming cells, the present invention helps to simplify the server in the system.

This and other objects are performed by the improved ingress circuit of the present invention. The ingress circuit includes a minimum service rate circuit that monitors the rate of arriving cells. The minimum service rate circuit notifies the connection server when cells arrive in conformance with the minimum service rate of the service contract. The minimum service rate circuit may use a continuous state leaky bucket or virtual scheduling algorithm as specified in the CCITT Recommendation I.371 document to determine if a cell is in conformance with the minimum service rate of the service contract. When a cell arrives that conforms to the minimum service rate, the minimum service rate circuit notifies the server and the server serves the queue associated with the connection.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements and in which.

DETAILED DESCRIPTION

Methods and schemes for using cell arrival information to make queue service decisions in a digital communication system are disclosed.

A Broadband Network

Figure 1:
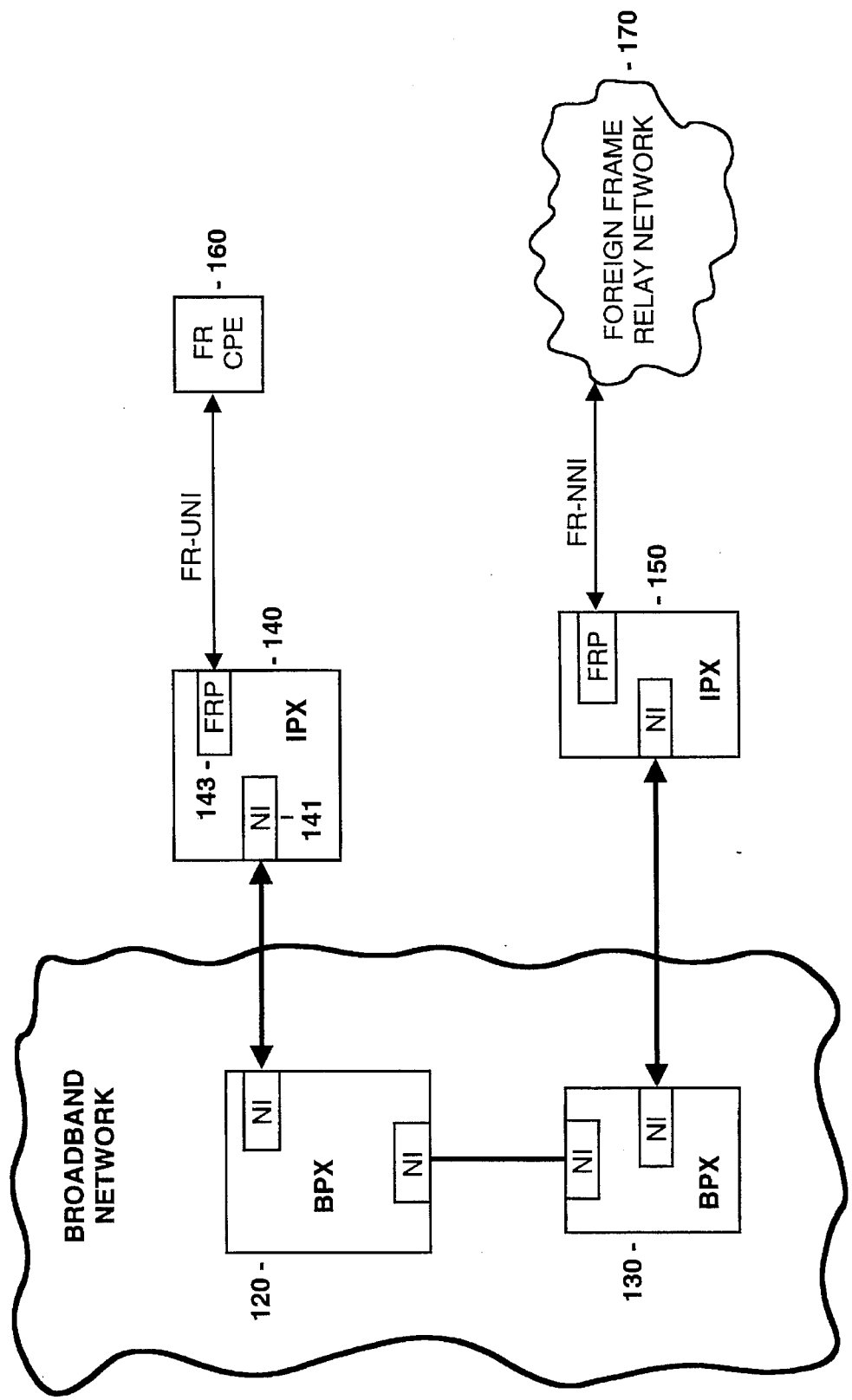
FIG. 1 illustrates a digital communication network constructed with Stratacom™ BPX™ and IPX™ digital switches.

FIG. 1 illustrates a digital communications network topology. The network illustrated in FIG. 1 is a cell switched digital communication network constructed of Broadband Packet Exchanger (BPX™) modules and Integrated Packet Exchanger (IPX™) modules sold by Stratacom of San Jose, Calif. The Stratacom BPX™ modules and the Stratacom IPX™ modules function as digital switches that are capable of building virtual connections for routing cells. The Stratacom BPX™ modules serve as the backbone for a broadband digital Wide Area Network (WAN). The Stratacom IPX™ modules couple smaller narrowband digital communication links to the broadband digital network.

Each BPX™ module is a digital switch coupled to one or more broadband digital communication lines. Examples of broadband digital communication lines include E3 lines, T3 lines, and OC3 lines. The BPX™ digital switches are also coupled to IPX™ digital switches using broadband digital communication links.

Each IPX™ digital switch in FIG. 1 is used to couple slower digital communication lines to the broadband digital communication network. The customer premise equipment 160 may consist of any type of digital communication equipment such a Private Branch Exchange (PBX) or a packet router.

Figure 2:
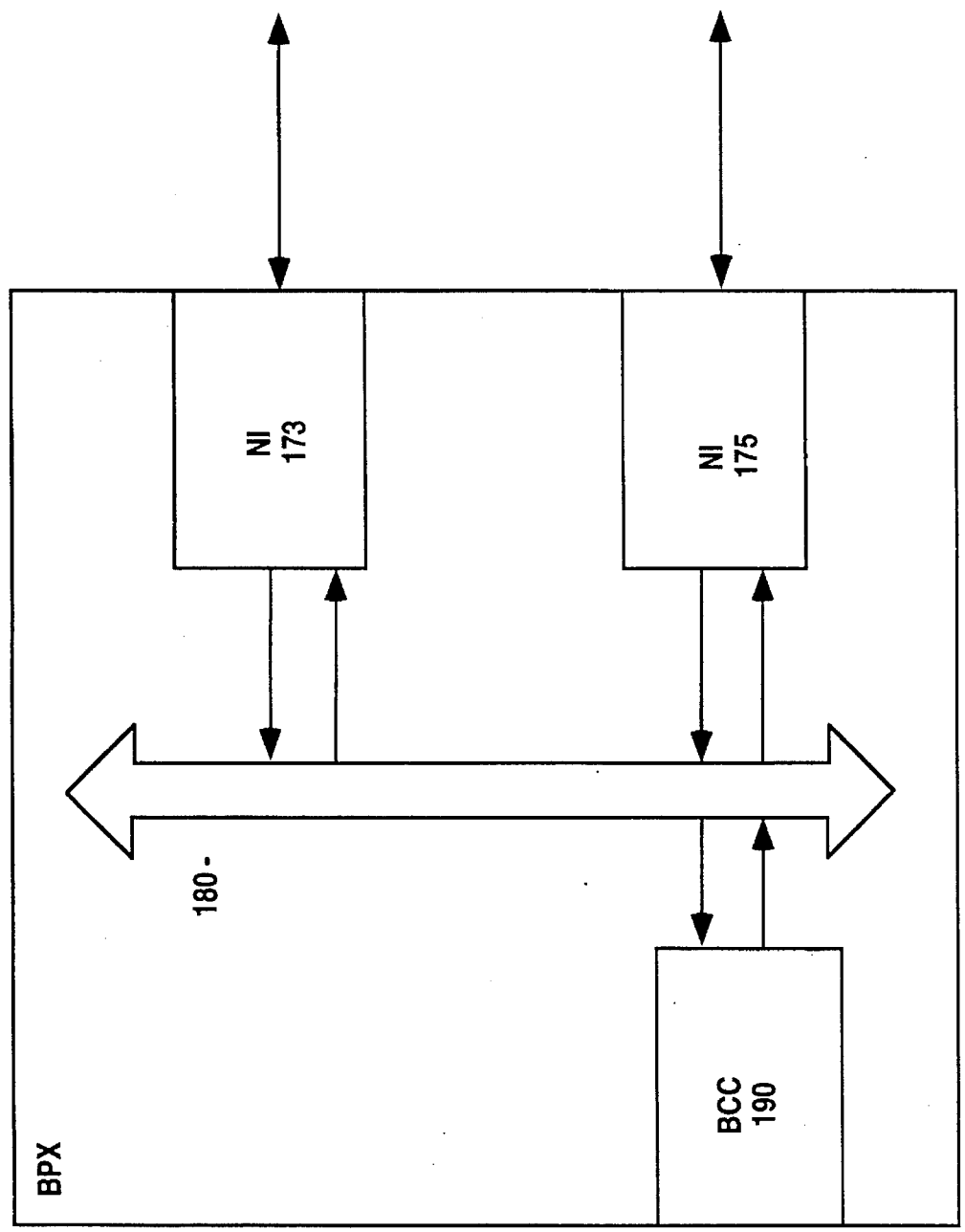
FIG. 2 illustrates a prior art internal block diagram of a Stratacom™ BPX™ digital switch.

FIG. 2 illustrates a block diagram of the internal mechanisms of an existing BPX™ digital switch. Each BPX™ digital switch consists of a plurality of Network Interface units (NI 173 and NI 175) and a BPX Control Card (BCC) unit 190.

Each Network Interface unit is connected to a broadband digital communication line. Every Broadband Network Interface unit is also coupled to a high-speed backplane bus 180 within the BPX™ digital switch. In the present embodiment the backplane bus 180 of the BPX™ comprises the Stratabus™.

The BCC unit 190 is also coupled to the backplane bus 180. The BCC unit 190 functions as a digital crossbar switch that routes data cells to and from all the different digital communication lines that are coupled to the BPX™ digital switch.

A Network Interface Card

Figure 3:
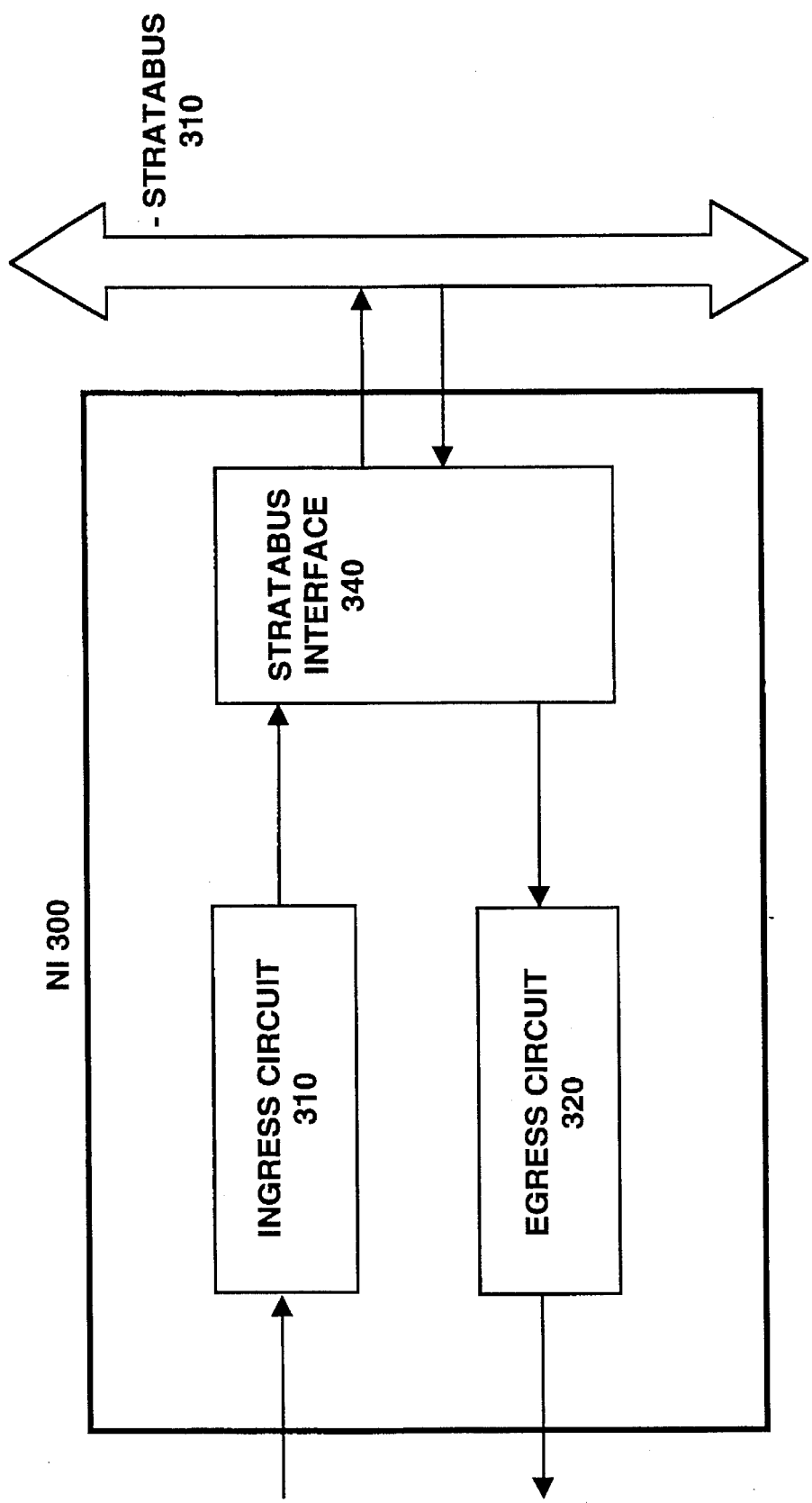
FIG. 3 illustrates an internal block diagram of a Network Interface card.

FIG. 3 illustrates an internal block diagram of a Network Interface card 300. In one embodiment, the Network Interface card 300 is a Stratacom ATM Service Interface (ASI) card 300. The Network Interface card 300 comprises an ingress circuit 310, an egress circuit 320 and a Stratabus™ interface circuit 340. The ingress circuit 310 is connected to a communications line and processes incoming data cells received from the communications line. The egress circuit 320 is also connected to the communications line and processes outgoing data cells. The Stratabus™ interface circuit 340 is coupled to both the ingress circuit 310 and the egress circuit 320 and distributes data cells to the Stratabus™ 310 within the BPX™ digital switch.

Figure 4:
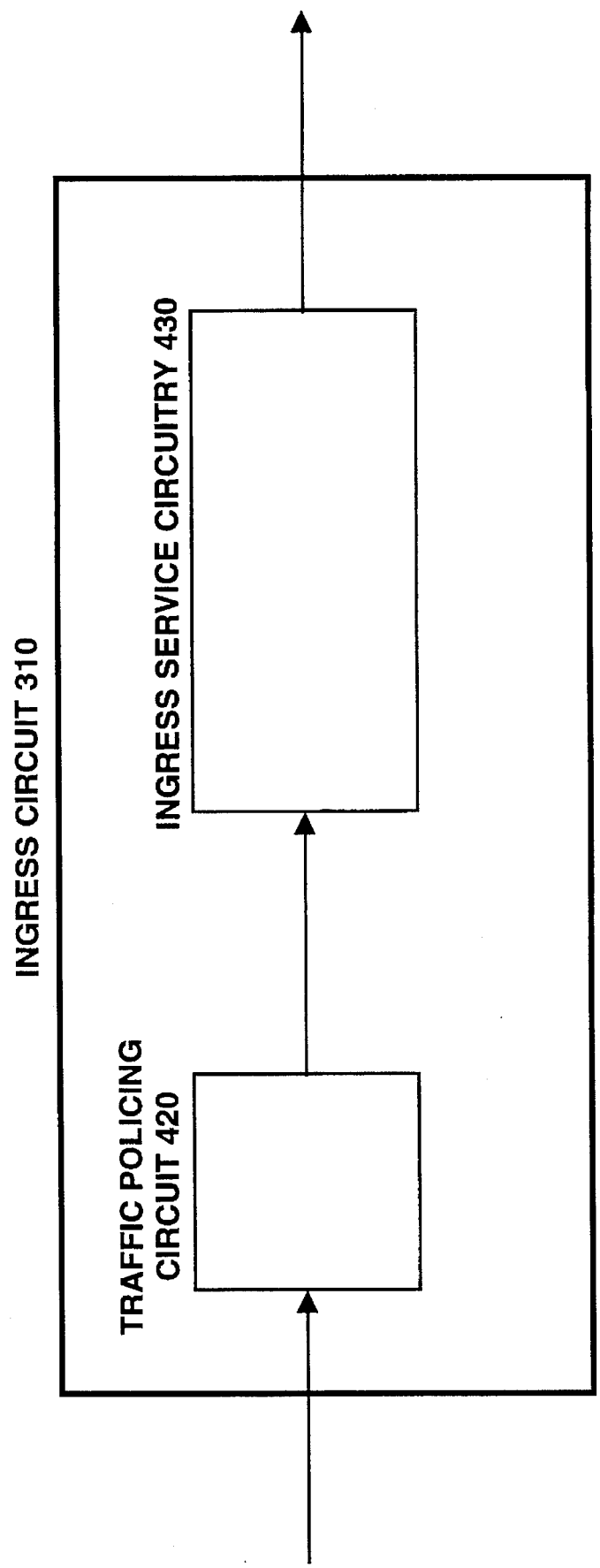
FIG. 4 illustrates an internal block diagram of the ingress circuit in a Network Interface card.

FIG. 4 illustrates an internal block diagram of the ingress circuit 310. The ingress circuit 310 consists of a Traffic Policing circuit 420 and the remaining ingress service circuitry 430. The purpose of the Traffic policing circuit 420 is to enforce the arrival contract by acting as a traffic policing device. The Traffic policing circuit 420 determines if each incoming data cell is a "conforming" cell. Specifically, the Traffic policing circuit 420 determines if each incoming data cell conforms with the limits placed upon the incoming data link according to the arrival contract.

For example, if a user sends a series of data cells so quickly that the user exceeds the maximum incoming data cell rate allowed by the arrival contract, then the Traffic policing circuit 420 will indicate that the cells are "nonconforming" data cells according to the arrival contract. Nonconforming data cells may be tagged as low priority or simply discarded. Discarded data cells may not be recovered. Data cells that are tagged as low priority are kept within the digital switch and transmitted if there is sufficient bandwidth available. However, data cells tagged as low priority are the first to be discarded when congestion occurs in the network.

The Traffic Policing Circuit

To enforce the limits specified within the arrival contract, the Traffic Policing circuit 420 implements a Generic cell rate algorithm such as the continuous-state leaky bucket algorithm as described in the CCITT Recommendation I.371 Document, Geneva 1992.

Figure 5A:
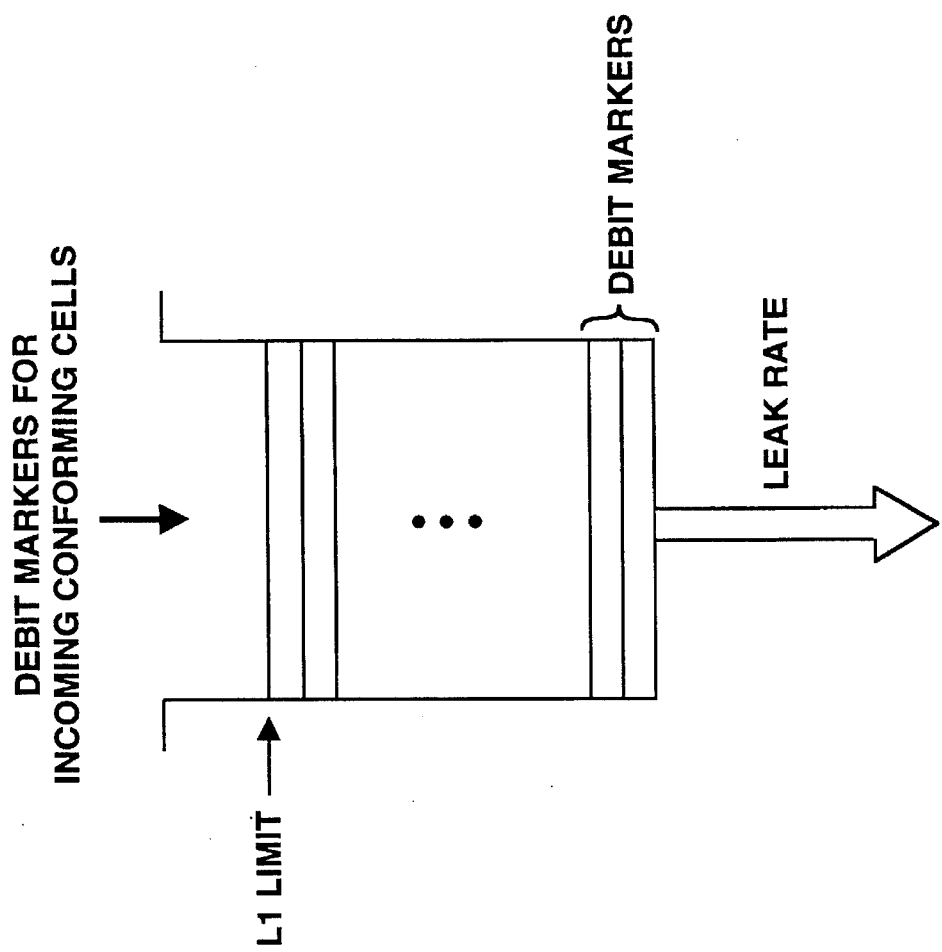
FIG. 5a illustrates a conceptual diagram of the Generic Cell Rate Algorithm (also known as the "leaky bucket" algorithm)
Figure 5B:
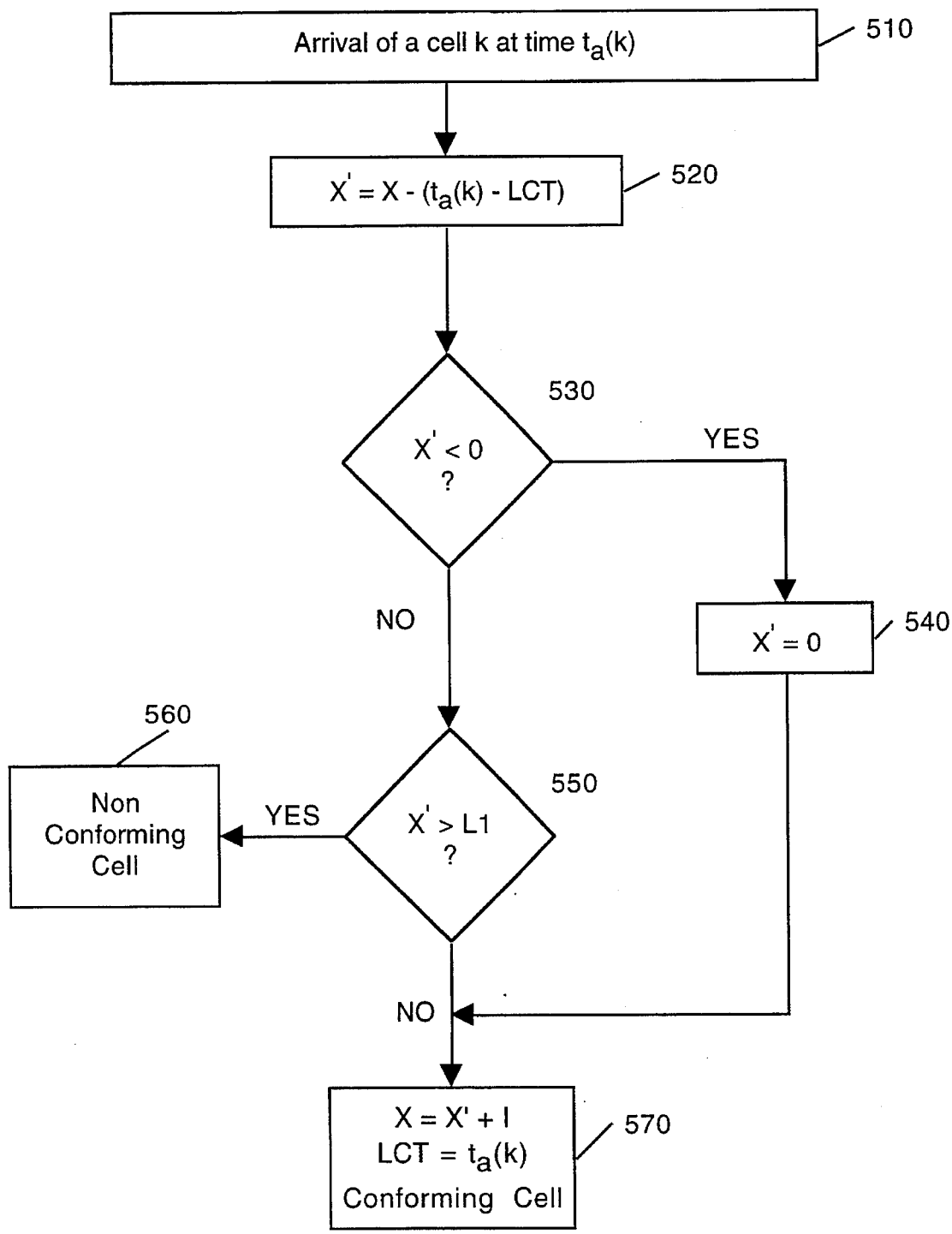
FIG. 5b illustrates a flow diagram of the Generic Cell Rate Algorithm (also known as the "leaky bucket" algorithm)

FIGS. 5a and 5b illustrate a conceptual diagram and a flow diagram that describe how the continuous-state leaky bucket algorithm operates. The virtual scheduling algorithm is similarly described in detail in the CCITT Recommendation I.371 Document. The continuous-state leaky bucket algorithm maintains a "bucket" of debit markers. FIG. 5a illustrates a conceptual diagram of the leaky bucket. Each time a cell arrives, the bucket depth is compared to a threshold limit to determine whether the cell is a conforming cell. The cell conforms if the bucket depth is less than the threshold limit. When a cell conforms, a debit marker is placed into the debit marker bucket. The debit markers are removed from the debit marker bucket at a leak rate equal to the sustainable cell rate. When cells arrive at a rate faster than the sustainable cell rate, the debit markers accumulate in the debit marker bucket. Eventually, the debit marker bucket exceeds the limit thereby signaling nonconforming cells. Although the continuous-state leaky bucket algorithm is explained with reference to a bucket of markers, the continuous-state leaky bucket algorithm is usually simply implemented using a single counter as explained below.

As illustrated in FIG. 5b, the continuous-state leaky bucket algorithm is invoked when a cell is received at step 510. A temporary bucket counter (X') is calculated at step 520 by subtracting off the amount of time since the last conforming cell. The temporary bucket counter (X') is tested at step 530 to determine if it is less than zero. If the temporary bucket counter (X') is less than zero then it is set to zero at step 540 (the bucket level is not allowed to drop below zero) and the cell is deemed conforming at step 570 where the bucket is incremented by the cost of processing the conforming cell. If the temporary bucket counter (X') was not less than zero at step 530 then the temporary bucket counter (X') is tested to see if it exceeds a limit set on the bucket. If the temporary bucket counter (X') exceeds the limit, then the cell is deemed nonconforming at step 560. Otherwise the cell is deemed conforming at step 570 and the bucket counter (X) is incremented by the cost of processing the conforming cell.

An Example of Traffic Policing

Figure 6:
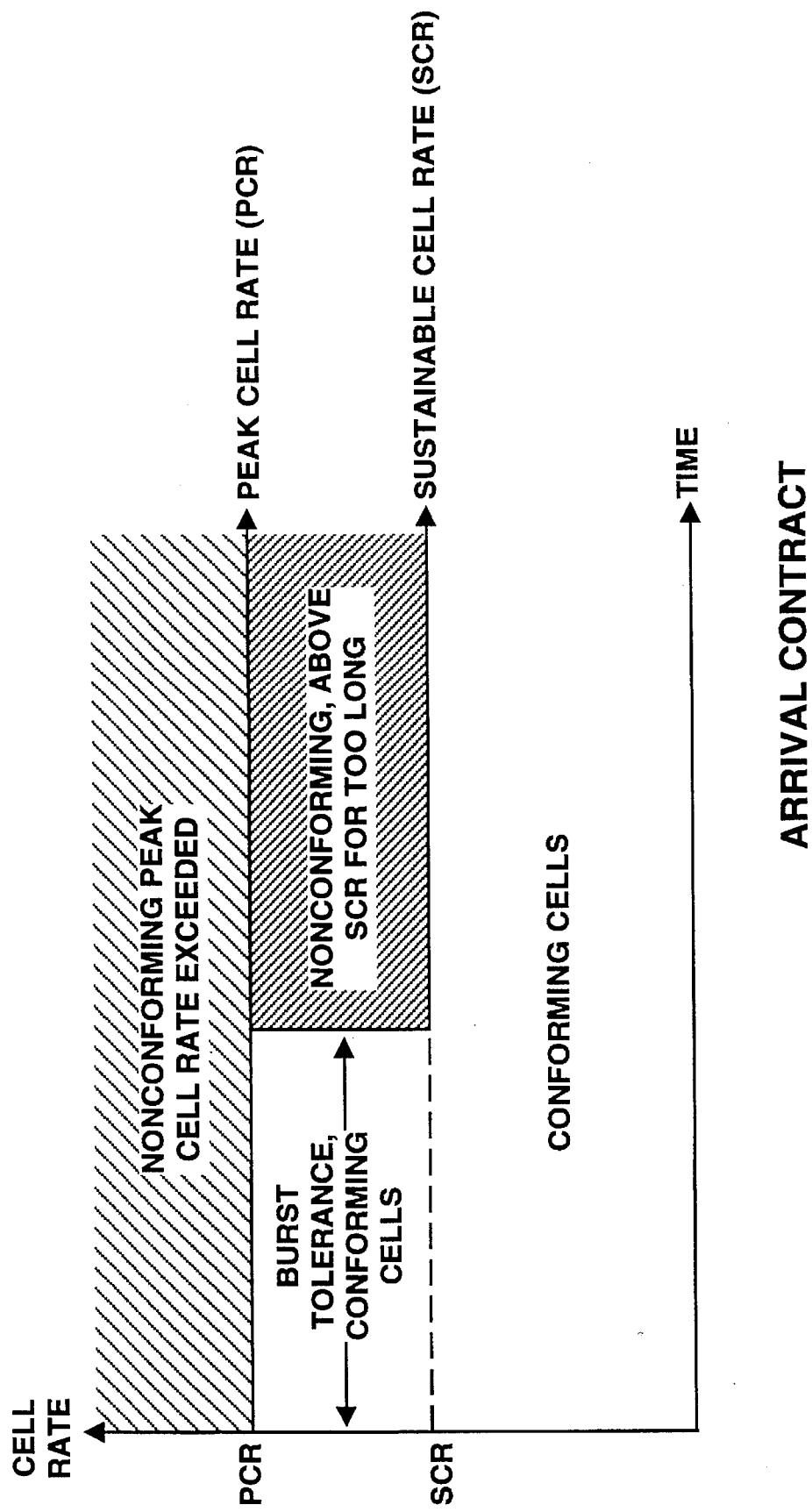
FIG. 6 illustrates a conceptual diagram of a typical user service contract with a digital communication service provider.

FIG. 6 illustrates a diagram of one possible type of data communication traffic contract. The data communication traffic contract illustrated in FIG. 6 is defined by different two data cell rates. The first data cell rate is the sustainable cell rate (SCR). The sustainable cell rate defines the maximum rate at which the user may continually transmit cells into the system without being penalized. If the user sends data cells at a rate less than the sustainable cell rate, then every data cell sent by the user will conform to the terms of the contract and thus every cell will be served by the data communication service provider.

The second data cell rate defined by the data communication traffic contract of FIG. 6 is the peak cell rate (PCR). The peak cell rate represents the highest cell rate at which the user may transmit cells during a short "burst" period. If the user ever transmits cells faster than the peak cell rate, then some cells will be nonconforming and will be discarded. When a user sends data cells at a rate faster than the sustainable cell rate (SCR) but below the peak cell rate (PCR) for a long period of time then the system will eventually overflow and cells will be found to be nonconforming, these nonconforming cells will be tagged. The amount of cells that the service provider will serve when cells are transmitted at a rate faster than the sustainable cell rate (SCR) but below the peak cell rate (PCR) is known as the burst tolerance.

Figure 7:
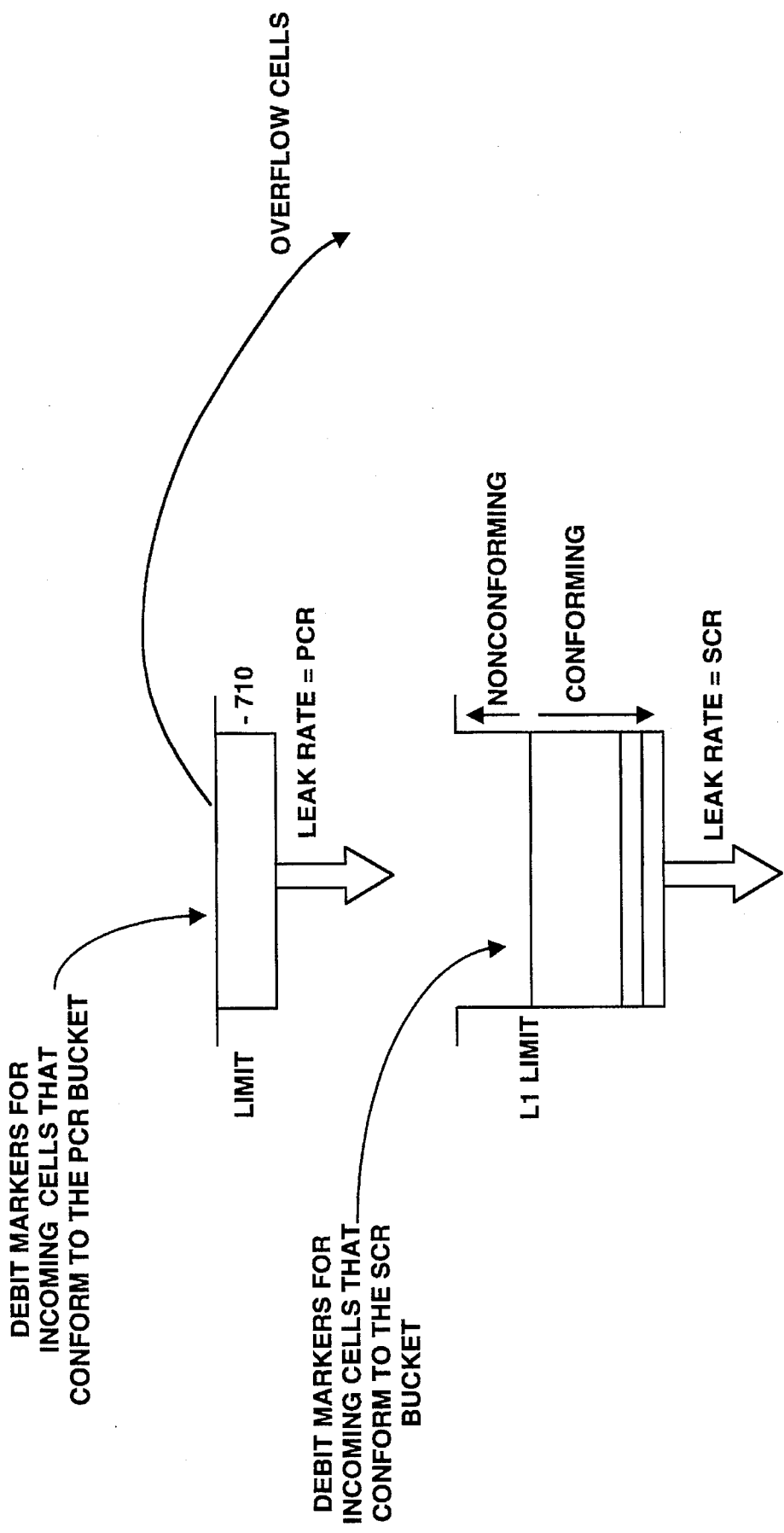
FIG. 7 illustrates a conceptual diagram of a Generic Cell Rate Algorithm that implements traffic policing for the user service contract of FIG. 6.

FIG. 7 illustrates how the data communication service contract of FIG. 6 can be implemented with a pair of leaky buckets. Each bucket represents a set of debit markers. The first bucket has room for enough debit markers to handle a burst of data cells. This is typically used to handle short bursts that are created due to the cell delay variation in the network. The first bucket has a debit marker leak rate equal to the peak cell rate (PCR). If the average data rate of the incoming data frames exceeds the peak cell rate, then the debit markers will overflow and the data cells that caused the overflow will be deemed nonconforming and therefore thrown out.

The second bucket has a leak rate equal to the sustainable cell rate (SCR) of the communications service contract. When the rate of incoming data cells exceeds the sustainable cell rate, the debit markers will accumulate in the second bucket. The debit markers will accumulate in the second bucket until the number of debit markers in the second bucket exceeds the L1 limit that implements the burst tolerance. When the debit markers that stack up in the second bucket exceed the L1 limit, subsequent incoming data cells are deemed nonconforming by the traffic policing circuit.

The Ingress Service Circuit

Figure 8:
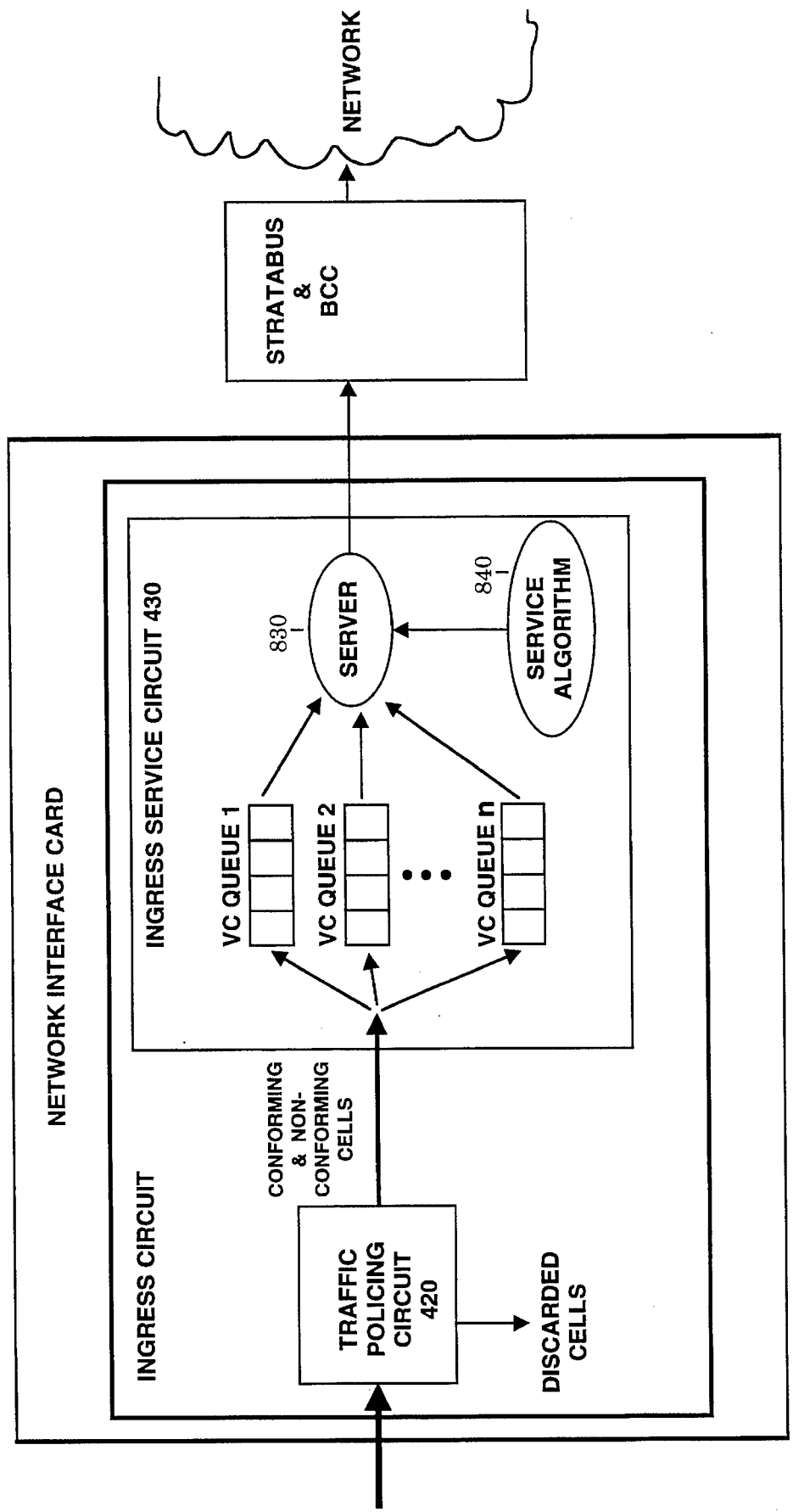
FIG. 8 illustrates an expanded block diagram of the ingress circuit including the traffic policing circuit and the service algorithm.

After cells pass through the Traffic Policing circuit 420, the cells are passed on to the ingress service circuitry 430. FIG. 8 illustrates a block diagram further defining the ingress service circuitry 430. The ingress service circuitry 430 in the Network Interface card places each received data cell into a queue associated with the connection. If no other connection shares the queue, it is referred to as a virtual connection queue. Each virtual connection queue is serviced by a queue server circuit 830.

The ingress service circuitry 430 is responsible for serving the virtual connections carried by the communication line in a manner that satisfies a communication contract between the communications provider and the customer. Typically, a minimum service rate is configured for each connection carried by the communication line. The communications provider is required to serve each connection at or above the minimum service rate configured for the connection to conform with the communications contract. Each connection may also have an initial burst specified. The initial burst is defined as the number of cells that will be served without queuing when the customer bursts traffic into that connection.

Prior art switching equipment, such as the Stratacom® IPX®, fulfill the terms of the service contract by implementing a sophisticated service algorithm that instructs a queue server circuit when to serve a queue associated with a virtual connection. The sophisticated service algorithm must carefully monitor each virtual connection queue in order to ensure that the initial burst and minimal service rate requirements are met.

Implementing Service Decisions With Arrival Information

Existing digital switches fulfill the minimum service rate requirements of a communications service contract using a sophisticated service algorithm 840 as illustrated in FIG. 8. To more efficiently fulfill the minimum service rate terms of the communications service contract, the present invention introduces the concept of using cell arrival information to assist the queue server in making service decisions. By using cell arrival information to assist in making service decisions, the implementation of the queue server circuit can be greatly simplified.

Figure 9:
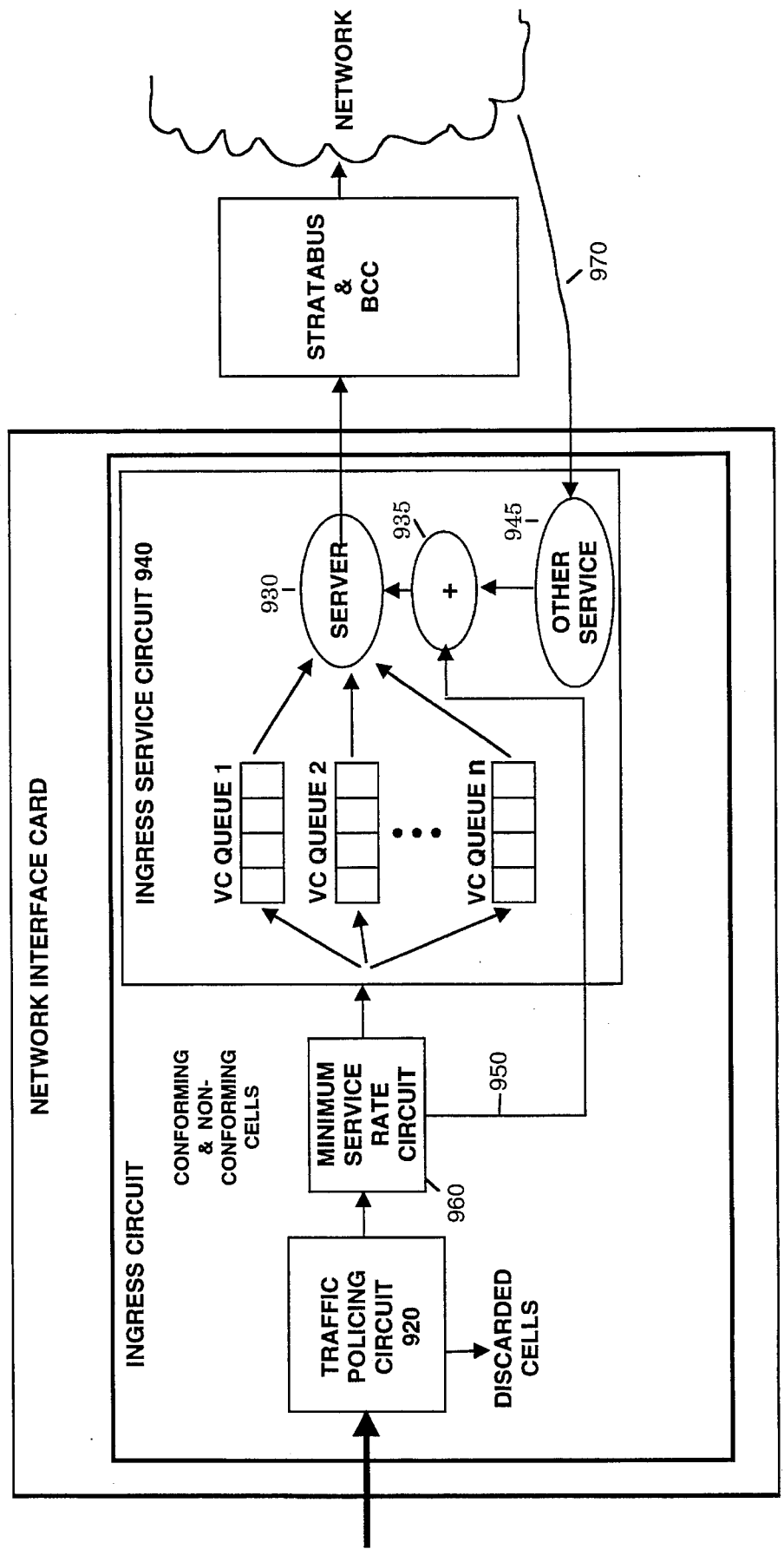
FIG. 9 illustrates a block diagram of an improved ingress circuit that includes a minimum service rate circuit that informs the server when it should serve a queue.

FIG. 9 illustrates an ingress circuit constructed according to the teachings of the present invention. In the improved ingress circuit of FIG. 9, the flow of arriving cells is routed to both the Traffic policing circuit 920 and a minimum service rate circuit 960. The Traffic policing circuit 920 enforces the limits on how fast the customer can transmit cells into the network as previously described. After cells pass through the Traffic policing circuit 920, the cells are queued into a plurality of virtual connection queues.

The minimum service rate circuit 960 implements an algorithm similar to the traffic policing circuit, except that the minimum service rate circuit 960 uses the information to make service decisions. For example the continuous-state leaky bucket algorithm or the virtual scheduling algorithm as described in the CCITT Recommendation I.371 Document can be used. A service decision information line 950 connects the minimum service rate circuit 960 and the service combining circuit 935. The service combining circuit 935 passes the service decisions made by the minimum service rate circuit 960 to the queue server circuit 930 which serves the queues. The service combining circuit 935 may also receive service decisions from other service circuits, such as the other service circuit 945. This service information is combined with the service information from the minimum service rate circuit 960 to cause the queue server circuit 930 to service virtual connection queues. The minimum service rate circuit will not send a service event if the traffic policing circuit discards the cell.

Figure 10A:
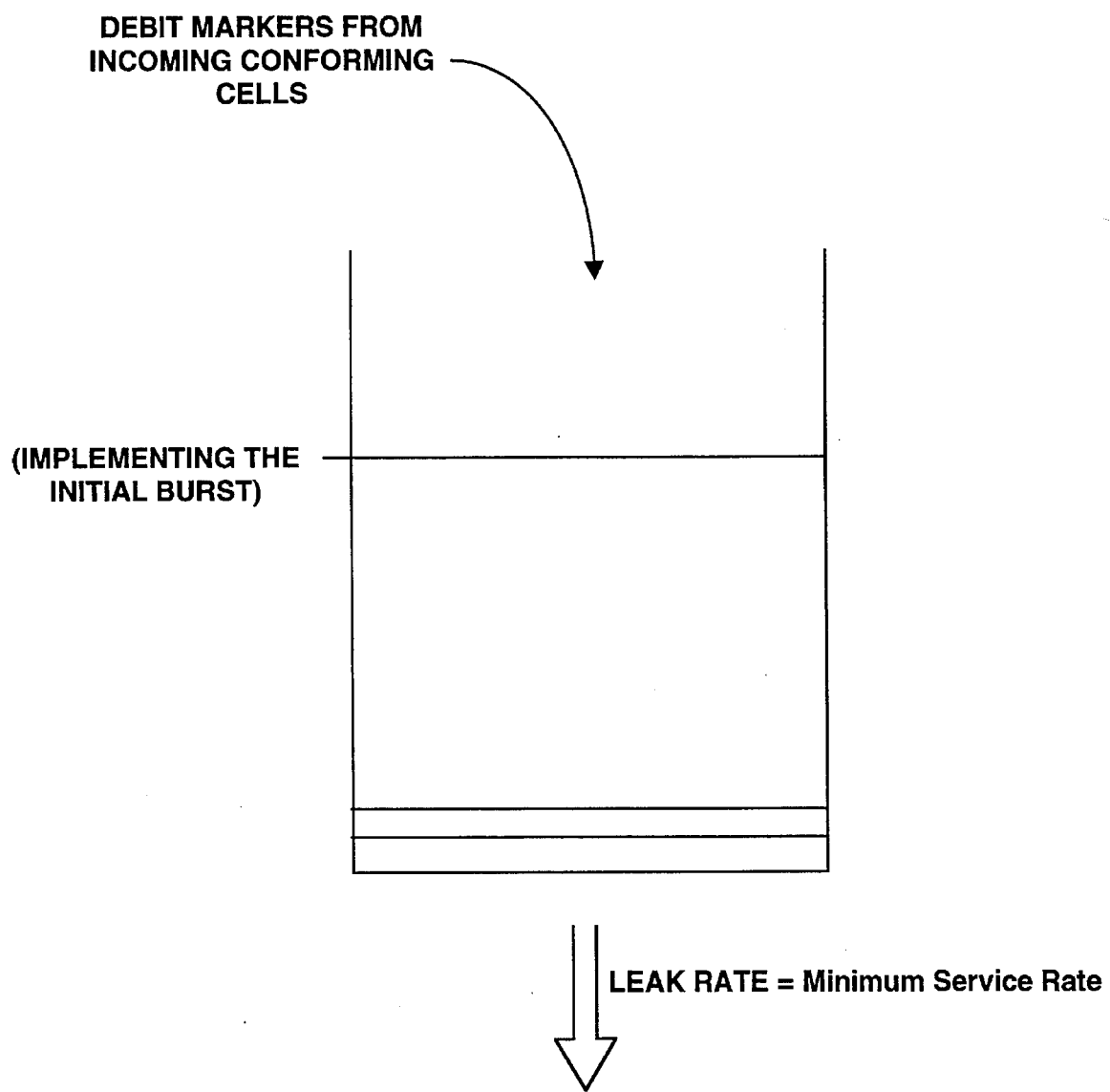
FIG. 10a illustrates a conceptual diagram of a leaky bucket for use in a minimum service rate circuit, the leaky bucket has a leak rate equal to the minimum service rate and an limit L that implements an initial burst.

For purposes of an example, this specification will describe an embodiment that uses the continuous-state leaky bucket algorithm although either the continuous-state leaky bucket algorithm or the virtual scheduling algorithm could be used. FIG. 10a illustrates a conceptual diagram of a leaky bucket for a minimum service rate circuit 960 that implements the requirements of the communication service contract. As illustrated in FIG. 10a, the markers are removed from leaky bucket at a rate equal to the minimum service rate. As long as the number of markers are below the limit L, each incoming cell will cause the minimum service rate circuit 960 to instruct the queue service circuit to serve the queue. The limit L is set such that if the customers transmits cells at the maximum allowed arrival rate, then the digital switch will immediately server the first n cells where n equals the initial burst. The limit L is a function of the maximum allowed arrival rate, the lead rate (minimum service rate), and the initial burst. Specifically:

$$\text{Limit } L = \frac{(\text{Maximum Arrival rate} - \text{Minimum Service Rate})}{\text{Maximum Arrival rate}} \times \text{Initial Burst}$$

For example, if the maximum allowed arrival rate equals twice the minimum service rate and the initial burst is 6 cells, then $$\text{Limit } L = \frac{(2 \times MSR - MSR)}{2 \times MSR} \times 6 \text{ cells} =$$

$$\frac{1}{2} \times 6 \text{ cells} = 3 \text{ cells}$$

An Example of Service Decisions Made With Cell Arrival Information

Figure 10B:
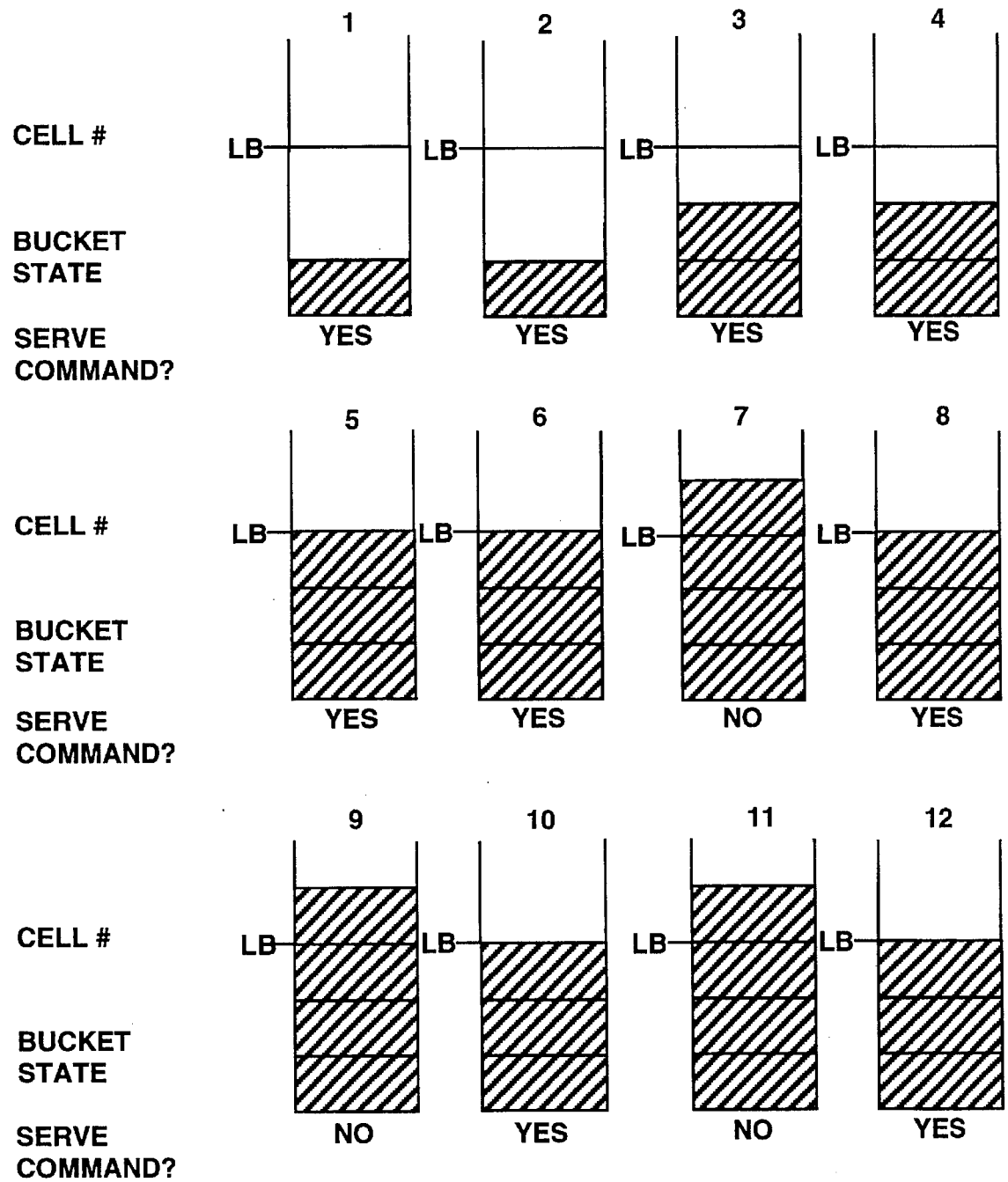
FIG. 10b illustrates a an example of how the minimum service rate circuit leaky bucket is used to make service decisions.

FIG. 10b illustrates an example of how the minimum service rate circuit 960 operates to fulfill the minimum service rate and the initial burst. In the example of FIG. 10b, the initial burst is set to 6 cells and the cells are being sent by the customer at the maximum cell rate which equals twice the minimum service rate. Thus, the leak rate of the leaky bucket is the minimum service rate and the limit L is set to 3. Starting from an initial empty situation, after the first cell arrives the bucket contains a marker for the first cell. Because the markers are below the limit L, a serve command is sent to the queue server circuit. When the second cell arrives, another marker is added to the bucket, but one marker leaks out such that the bucket contains a single marker again. Again, a serve command is sent to the queue server circuit. When the third cell arrives, another marker is added to the bucket. Since the bucket is still below the limit L, another serve command is sent. When the fourth cell arrives, another marker is added to the bucket and another marker leaks out such that the bucket contains two markers and another serve command is sent. When the fifth cell arrives, another marker is added to the bucket and another serve command is sent since the markers are still below the limit L. When the sixth cell arrives, another marker is added to the bucket but another marker leaks out such the markers remain below the limit L and another serve command is sent. When the seventh cell arrives, another marker is added to the bucket such that the limit L is exceeded. Since the markers are above the limit L, no service command is sent. When the eighth cell arrives, no marker is added to the bucket since the bucket had exceed the limit, but one marker drained out such that the markers are below the limit L. This causes a serve command to be sent to the queue server circuit. When the ninth cell arrives, another marker is added to the bucket such that the limit L is again exceeded cause no serve command to be sent. When the tenth cell arrives, no marker is added to the bucket since the bucket was above the limit, but another marker drained out such that the markers again fall below the limit L. This causes another serve command to be sent. Since the cells are being transmitted at twice the minimum service rate, the minimum service rate circuit 960 will continue sending a serve command for every other arriving cell.

Referring back to FIG. 9, it should be noted that the minimum service rate circuit 960 is not the only source of serve commands. The queue server circuit 930 may also receive service decisions from the other service circuit 945. In FIG. 9, the other service circuit 945 receives information about network congestion through congestion information line 970. When the service circuit 945 determines that there is not much congestion in the network, the service circuit 945 specifies that additional cells above the minimum service can be served.

Alternate embodiment: Traffic Policing Implementing Initial Burst

In an alternate embodiment, an existing traffic policing circuit is used to assist the queue server in making service decisions. By using information gathered from the traffic policing circuit to assist in making service decisions, the implementation of the queue server circuit is greatly simplified.

Figure 11:
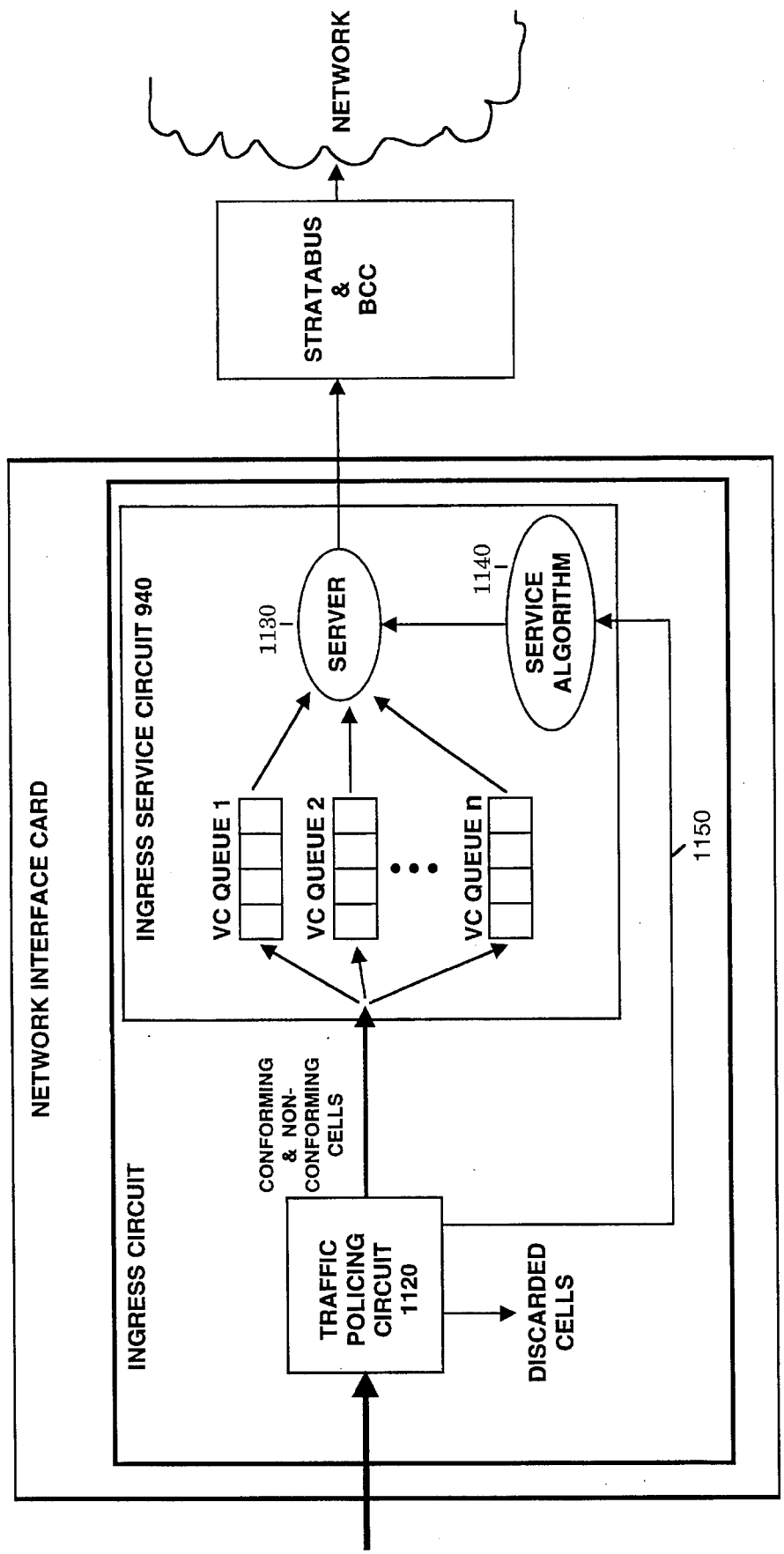
FIG. 11 illustrates a block diagram of an alternate embodiment of an improved ingress circuit that uses the existing traffic policing circuit to implement an initial burst.

FIG. 11 illustrates the alternate embodiment of an ingress circuit that implements the initial burst of the service contract using the traffic policing circuit. In the ingress circuit of FIG. 11, a service decision information line 1150 connects the traffic policing circuit 1120 and the service algorithm circuit 1140. A service algorithm circuit 1140 is coupled to the queue server circuit 1130 and controls the queue server circuit 1130. The service algorithm 1140 determines when each virtual queue will be served. In the ingress circuit of FIG. 11, the traffic policing circuit 1120 provides serve commands to the service algorithm circuit 1140 such that the Traffic policing circuit 1120 implements the initial burst portion of the service contract. The use of the traffic policing circuit information is best explained by example.

Figure 12:
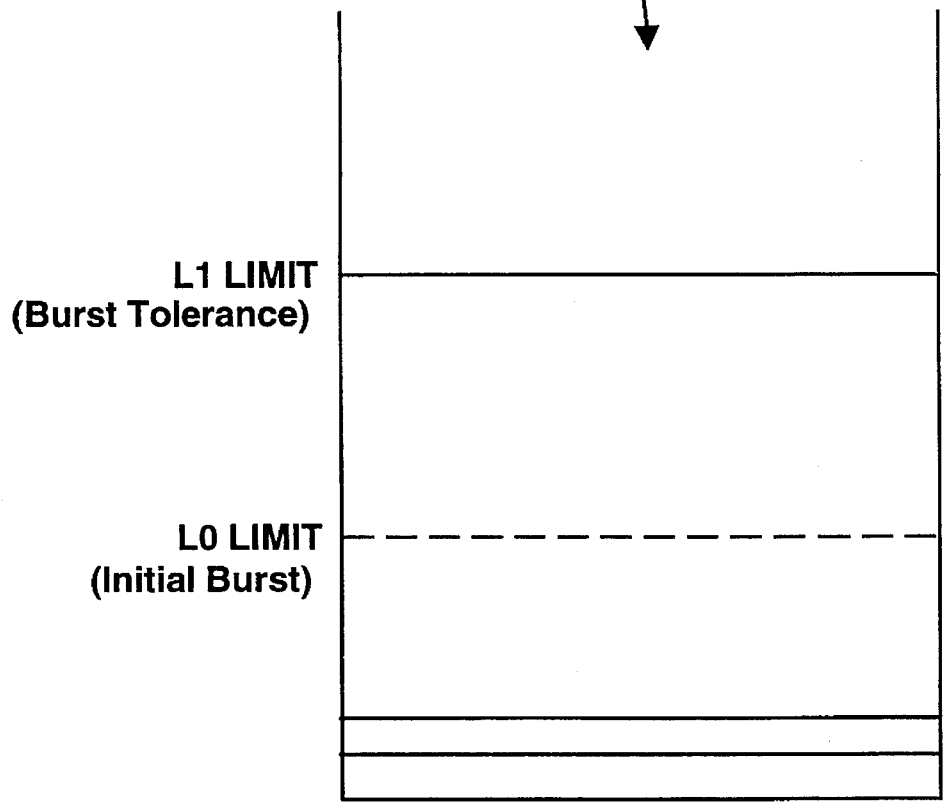
FIG. 12 illustrates a conceptual diagram of the leaky bucket in the alternate embodiment where the leaky bucket implements both traffic policing and an initial burst.

As described above, many traffic policing circuits implement some version of the continuous-state leaky bucket algorithm to enforce the limits on how fast customers may send cells into the network. To implement the initial burst of the service contract, a second limit can be added to the leaky bucket in the traffic policing circuit. FIG. 12 illustrates the Traffic policing leaky bucket further enhanced to include a second L0 limit. (The L1 limit is the burst tolerance limit as previously described.) The second L0 limit implements the initial burst for the service contract. If a data cell arrives and the debit markers in the traffic policing leaky bucket are below the L0 limit, then the traffic policing circuit 1120 will inform the service algorithm 1140 that a cell must be served (Since the initial burst has not been reached). Once the debit markers in the bucket stack up above the L0 limit, there is no longer a requirement to serve the cells immediately such that the incoming data cells are processed normally.

Thus, the service algorithm 1140 uses the information sent by the traffic policing circuit to implement the initial burst requirement. Specifically, when the traffic policing circuit indicates that cell has been received while the queue is below the L0 limit and sends a serve command, then the service algorithm 1140 instructs the queue server to serve the associated virtual queue. Thus, if the debit markers in the bucket remain below the L0 limit, then every cell will be served immediately. If one wishes to set a minimum service rate equal to the sustainable cell rate, then the L0 limit can be set equal to the L1 limit.

Certain types of virtual connection always require immediate service from the queue server 1130. For example, a virtual connection that is carrying a telephone connection must be serviced immediately. If a virtual connection carrying a telephone connection is not serviced fast enough, gaps and pops will be audible by the callers. By adjusting the service parameters of the service contract, the traffic policing circuit 1120 can provide the service algorithm 1140 with information such that those types of connections are serviced properly. For example, to handle a telephone connection that requires constant service, the Traffic policing circuit 1120 can set the L0 limit above the L1 burst tolerance limit. By setting the L0 limit above the L1 burst tolerance limit, every conforming cell that arrives will be immediately served by the queue server 1130 such that the telephone conversation will be carried properly.

Similar to the ingress circuit of FIG. 9, the service algorithm 1140 in FIG. 11 may also receive network congestion information from the network. Using the network congestion information, the service algorithm 1140 can adjust the amount of traffic allowed to enter the network based on the current network congestion.

In the foregoing specification, the invention has been described in terms of specific exemplary embodiments. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of controlling transmission of cells in a network, said method comprising the steps of:
    receiving a plurality of cells from an interface;
    storing said plurality of cells in a queue;
    making a set of service decisions to transmit said cells from said queue into said network, a portion of said set of service decisions generated based on a traffic policing decision that is made when said cell arrives from said interface wherein the traffic policing decision is based on the history of cell arrivals at the interface.

2. The method as claimed in claim 1 wherein said traffic policing decision is a continuous state leaky bucket algorithm.

3. The method as claimed in claim 2 wherein said continuous state leaky bucket algorithm has a limit L set by $$\text{Limit } L = \frac{(\text{Maximum Arrival rate} - \text{Minimum Service Rate})}{\text{Maximum Arrival rate}} \times \text{Initial Burst}.$$

4. The method of claim 1 wherein another portion of said service decisions is based on congestion in said network.

5. A method of controlling transmission of cells in a network, said method comprising the steps of:
    receiving a plurality of cells from an interface;
    policing said plurality cells received from said interface such that a set of requirements from an arrival contract are enforced, said step of policing performed by a traffic policing circuit;
    storing said in a cells in a queue;
    transmitting said cells from said queue into said network, said traffic policing circuit implementing an initial burst.

6. The method as claimed in claim 5 wherein said traffic policing circuit implements a continuous state leaky bucket algorithm.

7. The method as claimed in claim 6 wherein said continuous state leaky bucket algorithm has a limit L set by $$\text{Limit } L = \frac{(\text{Maximum Arrival rate} - \text{Minimum Service Rate})}{\text{Maximum Arrival rate}} \times \text{Initial Burst}.$$

8. An apparatus for servicing cells at a minimum service rate, said apparatus comprising the elements of:
    an interface, said interface for receiving a plurality of cells transmitted by a customer;
    a queue for storing said plurality of cells transmitted by said customer;
    a queue server for serving said plurality of cells stored in said queue; and
    a minimum service rate circuit, said minimum service rate circuit having a cell rate monitor for monitoring an incoming rate of said plurality of cells transmitted by said customer, said cell rate monitor signaling said queue server to serve a cell when a cell arrives in conformance with said minimum rate of service.

9. The apparatus as claimed in claim 8 wherein said cell rate monitor implements a continuous state leaky bucket algorithm.

10. The apparatus as claimed in claim 9 wherein said continuous state leaky bucket algorithm has a limit L set by $$\text{Limit } L = \frac{(\text{Maximum Arrival rate} - \text{Minimum Service Rate})}{\text{Maximum Arrival rate}} \times \text{Initial Burst}.$$

11. The method of claim 8 wherein said queue server also receives information about congestion in said network.

12. An apparatus for servicing cells at a minimum service rate, said cells transmitted by a customer, said cells destined for a network, said apparatus comprising the elements of:
    an interface, said interface for receiving a plurality of cells transmitted by said customer;
    a traffic policing circuit, said traffic policing circuit enforcing an arrival contract on said plurality of cells transmitted by said customer, said traffic policing implementing an initial burst defined in a service contract;
    a queue for storing said plurality of cells transmitted by said customer;
    a queue server for serving said plurality of cells stored in said queue, said queue server coupled to said traffic policing circuit to receive initial burst information.

13. The apparatus as claimed in claim 12 wherein said traffic policing circuit implements a continuous state leaky bucket algorithm.

14. The apparatus as claimed in 13 wherein said continuous state leaky bucket algorithm has a limit L set by $$\text{Limit } L = \frac{(\text{Maximum Arrival rate} - \text{Minimum Service Rate})}{\text{Maximum Arrival rate}} \times \text{Initial Burst.}$$

15. The apparatus of claim 12 wherein said queue server also receives information about congestion in said network.

* * * * *